(12) United States Patent
Mehra

(10) Patent No.: US 9,165,036 B2
(45) Date of Patent: *Oct. 20, 2015

(54) STREAMING TRANSACTION NOTIFICATIONS

(75) Inventor: Vinod Mehra, Pleasanton, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/529,661

(22) Filed: Jun. 21, 2012

(65) Prior Publication Data

US 2012/0331000 A1     Dec. 27, 2012

Related U.S. Application Data

(60) Provisional application No. 61/499,576, filed on Jun. 21, 2011.

(51) Int. Cl.
*G06F 7/00* (2006.01)
*G06F 17/00* (2006.01)
*G06F 17/30* (2006.01)

(52) U.S. Cl.
CPC ...... *G06F 17/30516* (2013.01); *G06F 17/3056* (2013.01); *G06F 17/30368* (2013.01)

(58) Field of Classification Search
CPC ................. G06F 17/30516; G06F 17/30979
USPC ............... 707/705, 771, 793; 705/4; 709/203
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |

(Continued)

OTHER PUBLICATIONS

USPTO, Non-Final Office Action issued in U.S. Appl. No. 13/529,700, mailed Apr. 16, 2014.

(Continued)

*Primary Examiner* — Susan Chen
(74) *Attorney, Agent, or Firm* — Ingrassia Fisher & Lorenz, P.C.

(57) ABSTRACT

Methods and systems are provided for identifying data transactions satisfying a streaming query and providing data corresponding to those data transactions to subscribed client devices. One exemplary method involves a server initiating a data transaction for a database entry in a database in response to input data received from a client device, determining whether the data transaction satisfies a streaming query, and indicating an association between the database entry and the streaming query when the data transaction satisfies the streaming query.

20 Claims, 6 Drawing Sheets

(56) References Cited

U.S. PATENT DOCUMENTS

| | | | |
|---|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,209,953 B2 | 4/2007 | Brooks |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,321,443 B2 | 11/2012 | Andrade et al. |
| 8,346,747 B2 * | 1/2013 | Liu et al. .................. 707/705 |
| 8,484,243 B2 * | 7/2013 | Krishnamurthy et al. .... 707/771 |
| 8,577,870 B2 | 11/2013 | Rajan et al. |
| 8,762,302 B1 | 6/2014 | Spivack et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0064443 A1 | 4/2004 | Taniguchi et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0225564 A1 * | 11/2004 | Walsh et al. .................. 705/14 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0031225 A1 | 2/2006 | Palmeri et al. |
| 2008/0209330 A1 | 8/2008 | Cruver |
| 2010/0017380 A1 | 1/2010 | Naibo et al. |
| 2010/0262650 A1 * | 10/2010 | Chauhan et al. ............. 709/203 |
| 2011/0302212 A1 * | 12/2011 | Agrawal et al. ............... 707/793 |
| 2012/0005205 A1 | 1/2012 | Bobick et al. |
| 2012/0078868 A1 | 3/2012 | Chen et al. |
| 2012/0271660 A1 * | 10/2012 | Harris et al. .................. 705/4 |

OTHER PUBLICATIONS

Witkowski, et al, "Continuous Queries in Oracle," http://www.vldb.org/conf/2007/papers/industrial/p1173-witkowski.pdf.

Jin et al., "ARGUS: Rete + DBMS = Efficient Continuous Profile Matching on Large-Volume Data Streams," Language Technologies Institute, School of Computer Science, Carnegie Mellon University, Jul. 6, 2004, https://www.evernote.com/shard/s1/sh/454f42d6-b156-4ac0-a084-5a09d2b13630/98847365f82171e34c1ee577acefe0d0.

Jin, et al., "ARGUS: Efficient Scalable Continuous Query Optimization for Large-Volume Data Streams," School of Computer Science, Computer Science Department, Carnegie Mellon University, 2006, https://www.evernote.com/shard/s1/sh/5dda0127-cb69-4bac-930b-18ce98fe95b7/33b59e25ab7d33b7e5c6bdfb51ec12d8.

Junyi Xie, "Handling Resource Constraints and Scalability in Continuous Query Processing," Department of Computer Science, Duke University, 2007.

Carbonell, et al., "Exploring Massive Structured Data in Argus," Carnegie Mellon University, DYNAMIX Technologies, NIMD PI Meeting, Nov. 2005.

Jin, "Optimizing Multiple Continuous Queries," Dissertation Defense, Carnegie Mellon, Oct. 31, 2006.

Eugster, et al., "The Many Faces of Publish/Subscribe," ACM Computing Surveys, vol. 35, No. 2, Jun. 2003, pp. 114-131.

USPTO, Final Office Action issued in U.S. Appl. No. 13/529,700, dated Oct. 14, 2014.

USPTO, Advisory Action issued in U.S. Appl. No. 13/529,700, dated Jan. 20, 2015.

USPTO, Notice of Panel Decision issued in U.S. Appl. No. 13/529,700, dated Mar. 5, 2015.

* cited by examiner

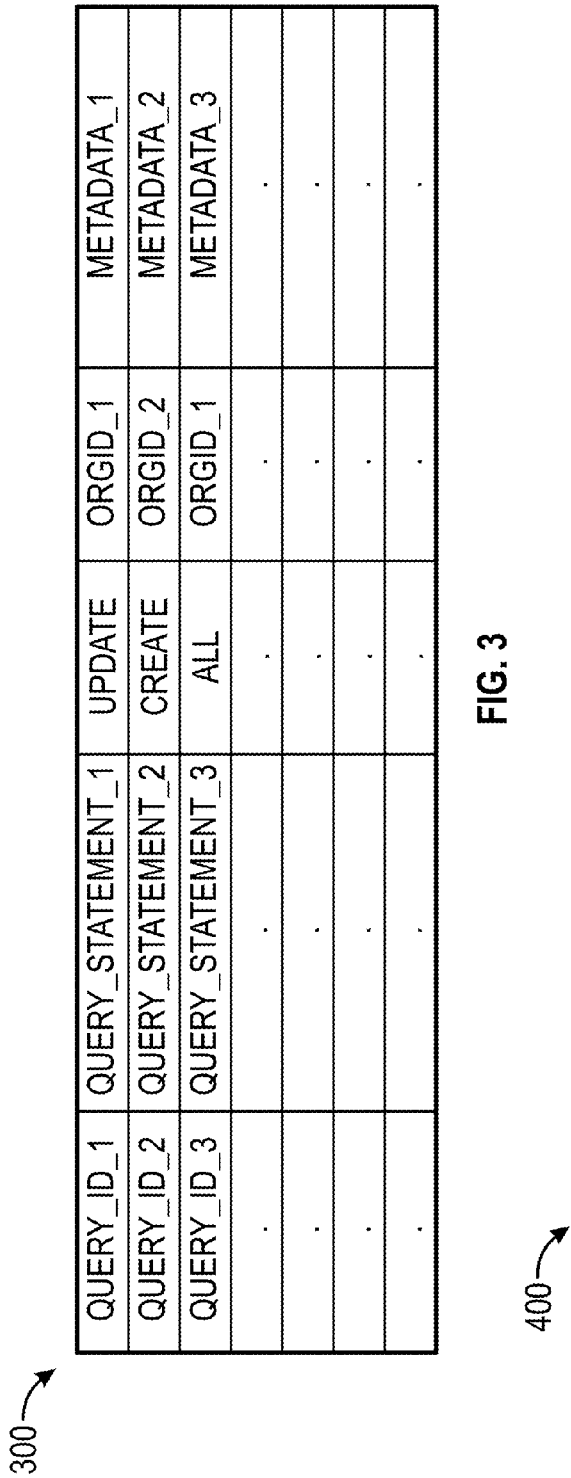

STREAMING TRANSACTION NOTIFICATIONS

CROSS-REFERENCE TO RELATED APPLICATION(S)

This application claims the benefit of U.S. provisional patent application Ser. No. 61/499,576, filed Jun. 21, 2011, the entire content of which is incorporated by reference herein.

The subject matter described herein is related to the subject matter described in U.S. patent application Ser. No. 13/529,700, filed concurrently herewith.

TECHNICAL FIELD

Embodiments of the subject matter described herein relate generally to computer systems configured to support on-demand applications, and more particularly, embodiments of the subject matter relate to methods and systems for providing notifications of data transactions substantially in real-time.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In practice, it may be desirable to notify users substantially in real-time when their tenant's data maintained in the multi-tenant database is updated or changed. For example, when one user creates a new record or modifies an existing record in the multi-tenant database, other users associated with the same tenant as that user may desire to be apprised of the update to their tenant's data. However, the performance costs associated with each individual user continuously and/or periodically querying the multi-tenant database for the desired information pertaining to those records and/or transactions is undesirably high, particularly as the number of tenants and/or users supported by the multi-tenant system increases.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 depicts an exemplary definition table suitable for use with the transaction identification process of FIG. 2;

FIG. 4 depicts an exemplary notification table suitable for use with the transaction identification process of FIG. 2;

DETAILED DESCRIPTION

Figure 1:
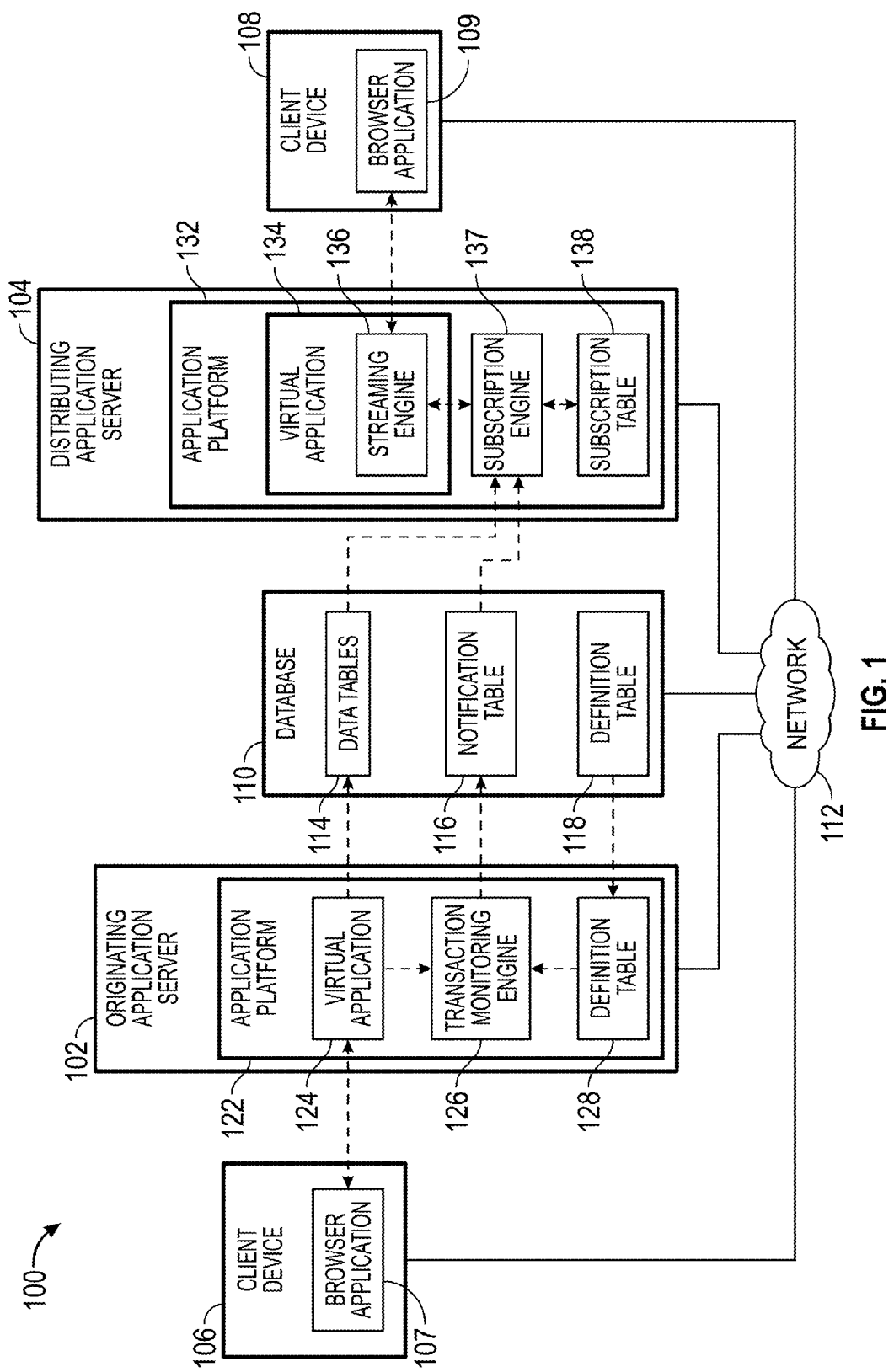
FIG. 1 is a block diagram of an exemplary application system.

Embodiments of the subject matter described herein generally relate to identifying data transactions that satisfy registered streaming queries and providing notification of those data transactions to users subscribed to those streaming queries substantially in real-time. As described in greater detail below, a streaming query is associated with a query statement that is used to identify data transactions that users who are subscribed to that streaming query should be notified of substantially in real-time. In this regard, a data transaction that satisfies a query statement associated with a streaming query and any notification qualifier associated with the streaming query may be understood as a notification-triggering data transaction that results in notifications provided to subscribed users. As described in greater detail below, rather than continuously querying the database using the query statements for the streaming queries, in exemplary embodiments, an application server monitors data transactions performed on behalf of client devices accessing the database via the application server for data transactions that satisfy one or more of the query statements associated with the streaming queries. In response to identifying a data transaction that satisfies a streaming query, the application server automatically updates the database substantially in real-time to indicate the entry (or record) in the database that is associated with that notification-triggering data transaction along with the association between that database entry (or record) and the streaming query that the notification-triggering data transaction satisfied.

At the same time, other application servers monitor the database on a substantially continuous basis (e.g., by periodically polling the database) for indications of data transactions satisfying streaming queries that are subscribed to by client devices accessing the database via these other application servers. When an application server identifies an indication of a data transaction satisfying a streaming query that is subscribed to by a client device accessing the database via that application server, the application server automatically obtains, from the database, the data associated with the database entry (or record) associated with the data transaction that satisfied the streaming query and provides at least a portion of the obtained data to the subscribed client device. In exemplary embodiments, a streaming connection (or channel) is established with the subscribed client device upon receiving a subscription request for the streaming query, so that the application server may provide the portion of the obtained data to the subscribed client device with limited delay. For example, in accordance with one or more embodiments, a long-polling request is held open by the application server, thereby allowing the application server to push the obtained data to the subscribed client device by providing a long-polling response message that includes the obtained data. In this manner, a portion of the data associated with a notification-triggering data transaction can be provided to the subscribed client device without having to perform additional handshaking or other signaling to establish the connection. Accordingly, by virtue of application servers updating the database to indicate notification-triggering data transactions substantially in real-time as they occur and the other application servers pushing data associated with those notification-triggering data transactions to subscribed client devices, the users of the subscribed client devices may be notified of those data transactions substantially in real-time without having to continuously query the database for those data transactions, thereby conserving database resources.

In one or more embodiments, the application servers are part of a multi-tenant system and provide instances of virtual applications to multiple different tenants, wherein the database is realized as a multi-tenant database maintaining data associated with the different tenants. However, it should be noted that although the subject matter may be described herein in the context of a multi-tenant implementation, the subject matter is not intended to be limited to multi-tenant systems unless clearly indicated by the context.

Turning now to FIG. 1, an exemplary on-demand application system 100 includes one or more application servers 102, 104 that dynamically create and support virtual applications that are provided to one or more client devices 106, 108 via a communications network 112, such as a wired and/or wireless computer network, a cellular network, a mobile broadband network, a radio network, or the like. In exemplary embodiments, each respective application server 102, 104 includes or otherwise implements an application platform 122, 132 that generates respective instances of virtual applications 124, 134 at run-time (e.g., or "on-demand") based upon data stored or otherwise maintained by a database 110 (e.g., in data tables 114) that is communicatively coupled to the application servers 102, 104 via the network 112. In accordance with one or more embodiments, the database 110 is realized as a multi-tenant database that is shared between multiple tenants, that is, the database 110 may store or otherwise maintain data associated with a number of different tenants, as described in greater detail below in the context of FIG. 7. In this regard, practical embodiments of the application system 100 may include any number of client devices, with the application servers 102, 104 providing multiple instances of virtual applications to multiple tenants supported by the database 110.

As described in greater detail below in the context of FIGS. 2-6, the application system 100 is configured to support users of client devices subscribing to streaming queries so that subscribed users receive substantially real-time notifications of transactions with respect to the database 110 that satisfy a streaming query that a respective user has subscribed to. In the illustrated embodiment, the first application server 102 monitors data transactions initiated or otherwise performed on behalf of its associated client devices 106, identifies when a data transaction satisfies a streaming query, and updates a notification table 116 in the database 110 to indicate that data transaction. For convenience, but without limitation, the first application server 102 may alternatively be referred to herein as the originating application server. In the illustrated embodiment, the second application server 104 receives, from the client device 108, a subscription request for a streaming query, monitors the notification table 116 for indication of data transactions satisfying a subscribed streaming query, and in response to identifying a data transaction satisfying a subscribed query, obtains data for the database entry associated with that data transaction from the database 110 and provides at least a portion of the obtained data to the subscribing client device 108. Accordingly, for convenience, but without limitation, the second application server 104 may alternatively be referred to herein as the distributing application server.

It should be understood that FIG. 1 is merely one simplified representation of the application system 100 provided for purposes of explanation and is not intended to limit the subject matter described herein in any way. In this regard, while various processes, tasks, functionality and/or other features may be described in the context of being performed by either the originating application server 102 or the distributing application server 104 for purposes of explanation, in practice, the originating application server 102 may perform the processes, tasks, functionality and/or other features described in the context of the distributing application server 104, and vice versa. To put it another way, the originating application server 102 may also function as a distributing application server (e.g., by performing the processes, tasks, functionality and/or other features described in the context of the distributing application server 104 in parallel), and similarly, the distributing application server 104 may also function as an originating application server.

Depending on the embodiment, the database 110 may be realized as a relational database or another suitable database capable of supporting the operations of the application system 100 described herein. In the illustrated embodiment, the database 110 maintains one or more data tables 114 which contain data associated with users and/or tenants in the application system 100 to support instances of virtual applications 124, 134 generated by the application servers 102, 104. In practice, the database 110 may include a database management system or other equivalent software that supports querying the data tables 114 (e.g., determining an optimal query plan and retrieving a particular subset of data from the data tables 114 in response to a query initiated or otherwise provided by a virtual application) and outputting the result of a query statement to a querying application server 102, 104.

In the illustrated embodiment, the database 110 also includes or otherwise maintains a definition table 118 that stores or otherwise maintains definition information pertaining to the streaming queries supported by the application system 100, as described in greater detail below in the context of FIGS. 2-3. For example, each row or entry in the definition table 118 may correspond to a streaming query that was previously registered or otherwise defined by a user of a client device 106, 108, an administrator within the application system 100, or the like. In exemplary embodiments, the definition information for a respective streaming query includes the query statement associated with the streaming query, metadata for the query statement, one or more notification qualifiers for the streaming query, a unique identifier associated with the streaming query, and a tenant identifier associated with the tenant that defined the streaming query or is otherwise associated with the streaming query. For example, a user or administrator associated with a particular tenant may create or otherwise define a streaming query (e.g., by inputting or otherwise providing the query statement, notification qualifiers, and the like via a virtual application), wherein the identifier associated with that tenant (e.g., that tenant's organization identifier) is stored or otherwise maintained in association with that streaming query. In exemplary embodiments, the metadata for the query statement includes the names or identifiers for the fields of data that are referenced or otherwise involved in the query statement and/or the names or identifiers for the type of object(s) referenced or otherwise involved in the query statement. For example, upon definition of a query statement for a streaming query that is being defined by a user of client device 106 via the virtual application 124, the application server 102 and/or application platform 122 may parse or otherwise analyze the query statement to identify the database object(s) referenced in the query statement along with the field(s) of the database object(s) referenced in the query statement, and store that identified metadata in association with the other definition information for the streaming query in the definition table 118. As described in greater detail below, the notification qualifiers for the query statement limit or otherwise qualify the streaming query to particular types of data transactions that will result in notifications being provided to subscribers to that streaming query. For example, the notification qualifier may indicate that the streaming query is only applicable to updates or modifications of existing data entries in the data tables 114 that satisfy the query statement, in which case the creation or instantiation of new data entries in the data tables 114 that satisfy the query statement would not result in real-time notifications, as described in greater detail below. Alternatively, the notification qualifier may indicate that the streaming query is only applicable to creation of new data entries in the data tables 114 that satisfy the query statement, in which case the modifications to existing entries in the data tables 114 that satisfy the query statement would not result in real-time notifications.

In exemplary embodiments, the database 110 also includes or otherwise maintains a notification table 116 that stores or otherwise maintains information pertaining to the data transactions satisfying a streaming query supported by the application system 100 that provide the basis for notifications provided to subscribed client devices. For example, as described in greater detail below in the context of FIGS. 2 and 4, each row or entry in the notification table 118 corresponds to a notification-triggering data transaction, and each entry may include an identifier for the database entry (or record) in the data tables 114 associated with that notification-triggering data transaction, an identifier for the streaming query satisfied by that notification-triggering data transaction, the data transaction type, and a timestamp or another indication of the relative time at which the notification-triggering data transaction occurred. In this regard, in exemplary embodiments, each time a new entry is created in or otherwise added to the notification table 118, a database transaction identification number is obtained from the database 110 and stored in association with the remaining information indicative of the notification-triggering data transaction.

In the illustrated embodiment of FIG. 1, the originating application server 102 generally represents a computing system or another combination of other processing logic, circuitry, hardware, firmware and/or other components configured to implement an application platform 122 that accesses the database 110 and generates or otherwise supports a virtual application 124 provided to the client device 106 via the network 112. In this regard, the originating application server 102 may include a processing system (e.g., a processor, controller, or the like) that includes or otherwise accesses a memory or another non-transitory computer-readable medium of storing programming instructions for execution by the processing system that, when read and executed by the processing system, cause the application server 102 and/or application platform 122 to generate an instance of the virtual application 124 that is provided to the client device 106 and perform various additional tasks, operations, functions, and processes described in greater detail below. In an exemplary embodiment, the originating application server 102 and/or application platform 122 accesses the database 110 to obtain or otherwise copy the streaming query definition information from the definition table 118 and caches or otherwise maintains the streaming query definition information in a local definition table 128 that is representative of the definition table 118 maintained by the database 110. The transaction monitoring engine 126 generally represents a software module or another feature that is generated or otherwise implemented by the application platform 122 to continuously monitor data transactions that are initiated or otherwise performed by the virtual application 124 on behalf of the client device 106 and identify data transactions that satisfy a streaming query based on the definition information maintained in definition table 128. As described in greater detail below in the context of FIG. 2, in response to identifying a data transaction satisfying a streaming query, the transaction monitoring engine 126 updates the notification table 116 in the database 110 by creating a new entry in the notification table 116 corresponding to that data transaction.

The client device 106 generally represents an electronic device that is utilized by a user to access the virtual application 124 and input and/or receive data pertaining to the virtual application 124. In practice, the client device 106 can be realized as any sort of personal computer, mobile telephone, tablet or other network-enabled electronic device. In an exemplary embodiment, the client device 106 includes a display device, such as a monitor, screen, or another conventional electronic display, capable of graphically presenting data and/or information provided by the virtual application 124 (including data retrieved from the database 110) along with a user input device, such as a keyboard, a mouse, a touchscreen, or the like, capable of receiving input data and/or other information from the user of the client device 106. In an exemplary embodiment, the user manipulates the client device 106 to execute a web browser application 107 and contact the application server 102 using a networking protocol, such as the hypertext transport protocol (HTTP) or the like, to request access to the virtual application 124, wherein the application platform 122 authenticates the user and generates the virtual application 124 at run time based upon information provided by the user of the client device 106 and/or data associated with the user (or the user's tenant) maintained by the database 110 (e.g., in one or more of the data tables 114). In this regard, the virtual application 124 includes code, data and/or other dynamic web content provided to the client device 106 that can be parsed, executed or otherwise presented by the browser application 107 running on the client device 106.

As described in greater detail below in the context of FIG. 2, the user of the client device 106 utilizes the virtual application 124 to interface with the database 110 to create, save, update, or otherwise modify data in one or more of the data tables 114, wherein each data transaction initiated by the user of the client device 106 is monitored by the transaction monitoring engine 126 and compared to the list of streaming queries maintained in the definition table 128 to identify data transactions satisfying a streaming query. In this regard, when the user of the client device 106 initiates or otherwise performs a data transaction (e.g., creating a new entry or updating an existing entry in one of the data tables 114) that satisfies a streaming query (e.g., by satisfying both the notification qualifiers and the query statement), the transaction monitoring engine 126 updates the notification table 116 by creating a new entry in the notification table 116 that indicates the notification-triggering data transaction (e.g., a new entry including the identifier associated with the database entry associated with the data transaction used for locating the database entry in the data tables 114, the data transaction type, the identifier associated with the streaming query, and the like).

Still referring to FIG. 1, similar to the originating application server 102 described above, the distributing application server 104 is realized as a computing system or another combination of processing logic, circuitry, hardware, firmware and/or other components that implements an application platform 132 that accesses the database 110 and generates or otherwise supports a virtual application 134 provided to a second client device 108 via the network 112. In this regard, the second client device 108 represents another electronic device that is utilized by another user to access an instance of a virtual application 134 and input and/or receive data pertaining to the virtual application 134. As described above, in one or more exemplary embodiments, the distributing application server 104 includes a processing system that includes or otherwise accesses a memory or another non-transitory computer-readable medium of storing programming instructions for execution by the processing system that, when read and executed by the processing system, cause the application server 104 and/or application platform 132 to generate the virtual application 134 that is provided to the client device 108 and perform various additional tasks, operations, functions, and processes described in greater detail below.

In the illustrated embodiment, the application platform 132 and/or virtual application 134 generates or otherwise provides a streaming engine 136 that is utilized to establish a streaming connection with the client device 108 for providing data used to generate substantially real-time notifications of data transactions satisfying a streaming query that the user of the client device 108 is subscribed to. In this regard, the user of the client device 108 may interact with the virtual application 134 presented by the browser application 109 indicate a streaming query that the user would like to be subscribed to, wherein the browser application 109 communicates with the streaming engine 136 to provide the subscription request for that streaming query and establish a streaming connection with the distributing application server 104 associated with that subscription request. In exemplary embodiments, the subscription request includes an identifier associated with the streaming query the user would like to be subscribed to, wherein the application platform 132 and/or virtual application 134 generates or otherwise provides a subscription engine 137 that is coupled to the streaming engine 136 to receive the subscription request and an identifier associated with the client device 108. In some embodiments, the identifier associated with the client device 108 is generated by the distributing application server 104 (e.g., by the streaming engine 136 in response to receiving a request from the client device 108) and assigned to the client device 108 by the distributing application server 104. The subscription engine 137 updates a subscription table 138 maintained by the distributing application server 104 and/or application platform 132 (e.g., in memory) to include the identifier associated with the streaming query and the identifier for associated with the client device 108 subscribed to that streaming query. In this manner, the subscription table 138 reflects the streaming queries that are currently subscribed to by client devices accessing the distributing application server 104 and the respective client device(s) associated with (or subscribed to) each streaming query. As described in greater detail below in the context of FIG. 5, the subscription engine 137 monitors the notification table 116 for data transactions that correspond to a streaming query that is subscribed to by the client device 108, in response to identifying a data transaction satisfying the client device 108 user's subscribed streaming query, the subscription engine 137 obtains, from the data tables 114, data associated with that notification-triggering data transaction and provides at least a portion of the obtained data to the streaming engine 136 along with the identifier for the subscribed client device 108 that should receive the obtained data. The streaming engine 136 communicates or otherwise provides the portion of the obtained data to the browser application 109 via the streaming connection associated with the received subscribed client device identifier, and in turn, the browser application 109 generates or otherwise provides a notification of the data transaction that satisfied the subscribed streaming query to the user of the client device 108 substantially in real-time based on the portion of obtained data provided by the streaming engine 136 on the application server 104. In some embodiments, the streaming engine 136 and the subscription engine 137 are allocated separate thread pools by the processing system of the distributing application server 104.

Figure 2:
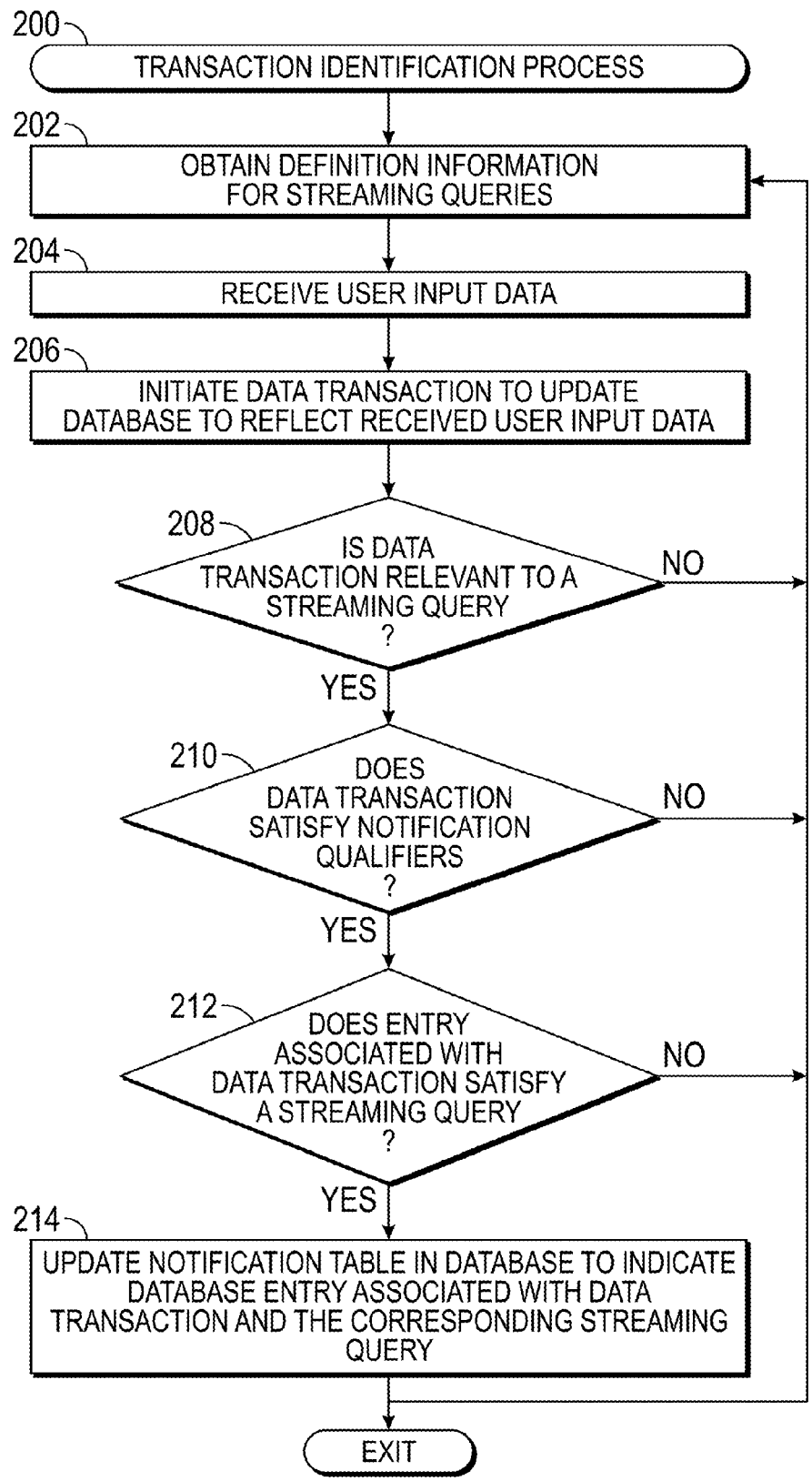
FIG. 2 is a flow diagram of an exemplary transaction identification process suitable for implementation by the application system of FIG. 1.

FIG. 2 depicts an exemplary embodiment of a transaction identification process 200 suitable for implementation by an application system, such as application system 100, to identify data transactions satisfying a streaming query for providing substantially real-time notifications of those data transactions on subscribed client devices, as described in greater detail below in the context of FIG. 5. The various tasks performed in connection with the illustrated process 200 may be performed by hardware, firmware and/or software executed by processing circuitry, or any combination thereof. For illustrative purposes, the following description may refer to elements mentioned above in connection with FIG. 1. In practice, portions of the transaction identification process 200 may be performed by different elements of the application system 100. That said, in exemplary embodiments, the transaction identification process 200 is performed by the originating application server 102 and/or application platform 122. It should be appreciated that the transaction identification process 200 may include any number of additional or alternative tasks, the tasks need not be performed in the illustrated order and/or the tasks may be performed concurrently, and/or the transaction identification process 200 may be incorporated into a more comprehensive procedure or process having additional functionality not described in detail herein. Moreover, one or more of the tasks shown and described in the context of FIG. 2 could be omitted from a practical embodiment of the transaction identification process 200 as long as the intended overall functionality remains intact.

Referring to FIG. 2, and with continued reference to FIG. 1, in an exemplary embodiment, the transaction identification process 200 initializes or otherwise begins by obtaining definition information for streaming queries supported by the application system (task 202). In exemplary embodiments, the originating application server 102 and/or application platform 122 accesses the database 110 to obtain or otherwise copy the streaming query definition information from the definition table 118 and caches or otherwise maintains the streaming query definition information in the local definition table 128. In this regard, for each streaming query that has been registered or otherwise defined by an administrator or another user within the application system 100, the local definition table 128 may maintain the query statement corresponding to that respective streaming query, metadata for that respective query statement, the tenant identifier associated with that respective streaming query, notification qualifiers for that respective streaming query, and an identifier associated with that respective streaming query. For example, FIG. 3 depicts an exemplary definition table 300 that may be maintained by the originating application server 102. For a first streaming query assigned or otherwise allocated a first entry (or row) in the table 300, the table 300 maintains an association between an identifier assigned to the first streaming query (e.g., 'QUERY_ID_1'), the query statement associated with the first streaming query that was defined by the user or administrator who created the first streaming query (e.g., 'QUERY_STATEMENT_1'), the data transaction type notification qualifier that was defined by the user or administrator who created the first streaming query (e.g., 'UPDATE' transactions only), the tenant identifier associated with the first streaming query (e.g., 'ORGID_1'), along with metadata pertaining to the query statement associated with the first streaming query (e.g., 'METADATA_1'). In this regard, the metadata pertaining to the query statement may include information pertaining to the object types and/or the data fields that are referenced by the query statement (e.g., the fields of the objects referenced by 'QUERY_STATEMENT_1'). As described above, in some embodiments, the metadata may be identified by the originating application server 102 and/or application platform 122 parsing the query statement to extract the referenced database objects and/or data fields. Similarly, the table 300 includes a second entry associated with a second streaming query that includes the identifier assigned to the second streaming query (e.g., 'QUERY_ID_2'), its associated query statement (e.g., 'QUERY_STATEMENT_2'), its associated data transaction type notification qualifier (e.g., 'CREATE' transactions only), its associated tenant identifier (e.g., 'ORGID_2'), and metadata pertaining to its query statement (e.g., 'METADATA_2'), and so on for additional streaming queries defined by administrators or users within the application system 100.

Referring again to FIG. 2, in an exemplary embodiment, the transaction identification process 200 continues by receiving input data from a user and performing or otherwise initiating a data transaction to update the database to reflect the received input data (tasks 204, 206). As described above, the originating application server 102 and/or application platform 122 generates or otherwise provides an instance of a virtual application 124 in a browser application 107 on a client device 106 that is utilized by the user of the client device 106 to interface with the database 110 to create, save, update, or otherwise modify data associated with the user and/or the user's tenant in one or more of the data tables 114. In this regard, in response to receiving input data from the user, the application platform 122 and/or virtual application 124 initiates or otherwise performs the appropriate data transaction to update one or more of the data tables 114 to reflect the user input data. For example, when the user is attempting to create a new instance of an object within the virtual application 124, the application platform 122 and/or the virtual application 124 creates a new entry for that type of object in one of the data tables 114 that includes the received user input data defining attributes for the various fields of the new instance of the object. In other embodiments, when the user is attempting to modify or otherwise update data for an existing instance of an object within the virtual application 124, the application platform 122 and/or the virtual application 124 updates or otherwise modifies the existing entry for that object in one of the data tables 114 by overwriting one or more fields of the existing entry to reflect the received user input data.

In exemplary embodiments, the transaction identification process 200 continues by monitoring the data transactions initiated or otherwise performed on behalf of client devices for data transactions that satisfy an existing streaming query. The transaction identification process 200 determines or otherwise identifies whether a data transaction is relevant to an existing streaming query based on the metadata and tenant identifiers associated with the existing streaming queries by comparing the data fields, object types, tenant identifier and/or other metadata associated with the respective data transaction to the metadata and tenant identifiers associated with the existing streaming queries (task 208). For example, in accordance with one or more embodiments, the transaction monitoring engine 126 monitors each data transaction initiated or otherwise performed by the application platform 122, and for each data transaction, the transaction monitoring engine 126 identifies the data fields and/or other metadata involved in the data transaction and compares the data fields and/or other metadata for a respective data transaction to the metadata for each of the streaming queries maintained in the definition table 128 to identify data transactions having associated data fields and/or other metadata that match the metadata of a streaming query in the definition table 128. In this regard, if the data fields and/or other metadata associated with the data transaction do not match all of the metadata for a particular streaming query, the transaction monitoring engine 126 determines that data transaction is not relevant to that particular streaming query. For example, if a data transaction involves modifying the account value field of an 'Account' object or defining the account value field of a new 'Account' object and the metadata for a streaming query indicates that the 'Account' object account value field is referenced in the query statement, the transaction monitoring engine 126 may identify or otherwise determine that the data transaction is relevant to that streaming query. However, if the tenant identifier for that streaming query is different from the tenant identifier associated with the user responsible for the data transaction, the transaction monitoring engine 126 may determine the data transaction is not relevant to the streaming query because the tenant associated with the data transaction does not match the tenant associated with the streaming query. When the transaction identification process 200 determines a data transaction is not relevant to any streaming queries, the data transaction is effectively filtered out from further processing and/or analysis and the transaction identification process 200 exits or repeats the loop defined by tasks 202, 204, 206 and 208 to maintain updated streaming query definitions and continuously monitor subsequent data transactions performed on behalf of client devices.

When the transaction identification process 200 determines a data transaction is relevant to a streaming query, the transaction identification process 200 determines or otherwise identifies whether the data transaction satisfies the notification qualifiers for that streaming query (task 210). In this regard, if the data transaction involves updating or otherwise modifying an existing entry in the database 110 and the notification qualifier indicates that streaming query is limited to the creation of new entries in the database 110, the transaction monitoring engine 126 determines that the data transaction does not satisfy the notification qualifier for the streaming query. Similarly, if the data transaction involves creating a new entry in the database 110 and the notification qualifier indicates that streaming query is limited to updating or otherwise modifying existing entries in the database 110, the transaction monitoring engine 126 determines that the data transaction does not satisfy the notification qualifier for the streaming query. For example, continuing the above example, if the data transaction involves modifying the account value field of an existing 'Account' object and the notification qualifier for the streaming query limits the streaming query to creation of new 'Account' objects, the transaction monitoring engine 126 determines the data transaction does not satisfy the notification qualifier for the streaming query. In a similar manner as described above, when the transaction identification process 200 determines a relevant data transaction does not satisfy the notification qualifier for a streaming query, the data transaction is effectively filtered out and the transaction identification process 200 exits or repeats to continuously monitor subsequent data transactions performed on behalf of client devices. Conversely, when the data transaction involves creating a new 'Account' object having some user input value for the account value field and the notification qualifier for the streaming query limits the streaming query to creation of new 'Account' objects, the transaction monitoring engine 126 determines the data transaction satisfies the notification qualifier for the streaming query.

In exemplary embodiments, when the transaction identification process 200 determines a data transaction is both relevant to a particular streaming query and satisfies the notification qualifier for that particular streaming query, the transaction identification process 200 continues by determining or otherwise identifying whether the data transaction satisfies the query statement for that particular streaming query and updating the notification table in the database to indicate the entry associated with the data transaction when the data transaction satisfies the query statement (tasks 212, 214). In exemplary embodiments, the transaction monitoring engine 126 compares the values for data fields of the database entry associated with the data transaction to the query statement to identify whether the values for the database entry match or otherwise are within the range provided by the query statement. To put it another way, the transaction monitoring engine 126 effectively executes or otherwise performs the query statement on the database entry associated with the data transaction to determine whether the query statement would return the database entry associated with the data transaction as a result of the query statement if the query statement where executed by the database 110. It should be noted that by virtue of the transaction identification process 200 filtering out data transactions that are not relevant to the streaming query or otherwise do not satisfy the notification qualifiers for a streaming query, processing resources of the application server 102 are conserved by not evaluating the query statements for each of the streaming queries on each of the data transactions initiated by the application platform 122.

When the transaction monitoring engine 126 determines that the database entry associated with a data transaction would be returned as a result of executing the query statement associated with the streaming query, the transaction monitoring engine 126 updates the notification table 116 to indicate the database entry associated with the data transaction. In an exemplary embodiment, the transaction monitoring engine 126 creates a new entry (or row) in the notification table 116 that includes a unique numerical identifier (or record identifier) corresponding to the location of the database entry associated with the notification-triggering data transaction in one or more of the data tables 114, the identifier associated with the streaming query, and the transaction type associated with the data transaction. Additionally, in exemplary embodiments, the new entry in the notification table 116 is timestamped with a transaction identifier generated by the database 110 upon creation of the new entry in the notification table 116.

For example, continuing the above example, if the data transaction involves creating a new 'Account' object having a value for the account value field of 12,500 and the query statement is intended to return 'Account' objects having a value for the account value field greater than 10,000 (e.g., 'SELECT name, value from account WHERE value >10000'), the transaction monitoring engine 126 may determine the data transaction satisfies the query statement in addition to the notification qualifier thereby satisfies the streaming query. In response to identifying the data transaction satisfies the query statement, the transaction monitoring engine 126 creates a new entry in the table 116 that includes a numerical identifier corresponding to the location of the new 'Account' object in the data tables 114, the streaming query identifier associated with the query statement, and the transaction type as the creation of a new entry in the database 110. Conversely, if the data transaction involved creating a new 'Account' object having a value for the account value field of 5,000 and the query statement is intended to return 'Account' objects having a value for the account value field greater than 10,000, the transaction monitoring engine 126 would determine the data transaction does not satisfy the query statement and the transaction identification process 200 exits or continues by monitoring subsequent data transactions without updating the notification table 116.

FIG. 4 depicts an exemplary notification table 400 that may be updated by the transaction monitoring engine 126 and maintained by the database 110 in conjunction with the transaction identification process 200. In this regard, in response to identifying a data transaction to create a new entry in the database 110 that satisfies the query statement associated with the second entry in the definition table 300 (e.g., 'QUERY_STATEMENT_2'), the transaction monitoring engine 126 creates an entry in the notification table 400 that includes the unique numerical identifier corresponding to the location of that new database entry in the data tables 114 (e.g., 'RECORD_ID_3'), the streaming query identifier associated with the second query statement (e.g., 'QUERY_ID_2'), and the transaction type as the creation of a new entry in the database 110 (e.g., 'CREATE'). Additionally, the entry in the notification table 400 includes a timestamp corresponding to the database time when the entry in the notification table 400 was created (e.g., 'DB_TIME_1').

Referring again to FIG. 2, in exemplary embodiments, the transaction identification process 200 repeats throughout operation of the application system 100 to update the local definition table 128 maintained by the originating application server 102 and continuously monitor data transactions initiated on behalf of the client device 106. In an exemplary embodiment, the application server 102 and/or application platform 122 periodically accesses the database 110 to identify or otherwise determine if any changes have been made to the definition table 118 relative to the instance of the definition table 128 maintained locally, and in response to identifying changes to the definition table 118 maintained by the database 110, the application server 102 and/or application platform 122 updates, overwrites, or otherwise modifies the local definition table 128 to reflect the updated definition table 118. In this regard, as new streaming queries are added or existing streaming queries are deleted or modified, the table 128 is updated so that the transaction monitoring engine 126 utilizes the most recent streaming query definition information when monitoring subsequent data transactions.

Referring again to FIG. 4, and with continued reference to FIGS. 1-3, in the illustrated embodiment, at some subsequent time after updating the notification table 400 to reflect the data transaction satisfying the second streaming query, the transaction monitoring engine 126 identifies a data transaction performed to update an existing entry in the database 110 as satisfying the query statement associated with the first entry in the definition table 300 (e.g., 'QUERY_STATEMENT_1'). In response, the transaction monitoring engine 126 updates the table 400 by creating a second entry that includes the unique numerical identifier corresponding to the location of the existing entry in the data tables 114 that was modified (e.g., 'RECORD_ID_2'), the streaming query identifier associated with the first query statement (e.g., 'QUERY_ID_1'), the transaction type as the updating or modification of an existing entry in the database 110 (e.g., 'UPDATE'), and a timestamp corresponding to the subsequent database time when the entry in the notification table 400 was created (e.g., 'DB_TIME_2'). Subsequently, the transaction monitoring engine 126 identifies a data transaction performed to update an existing entry in the database 110 as satisfying the query statement associated with the third entry in the definition table 300 (e.g., 'QUERY_STATEMENT_3'), and in response, the transaction monitoring engine 126 updates the table 400 by creating a third entry that includes the unique numerical identifier corresponding to the location of the existing entry in the data tables 114 that was modified (e.g., 'RECORD_ID_1'), the streaming query identifier associated with the third query statement (e.g., 'QUERY_ID_3'), the transaction type as the updating or modification of an existing entry in the database 110 (e.g., 'UPDATE'), and a timestamp corresponding to the subsequent database time when the third entry in the notification table 400 was created (e.g., 'DB_TIME_3').

Figure 5:
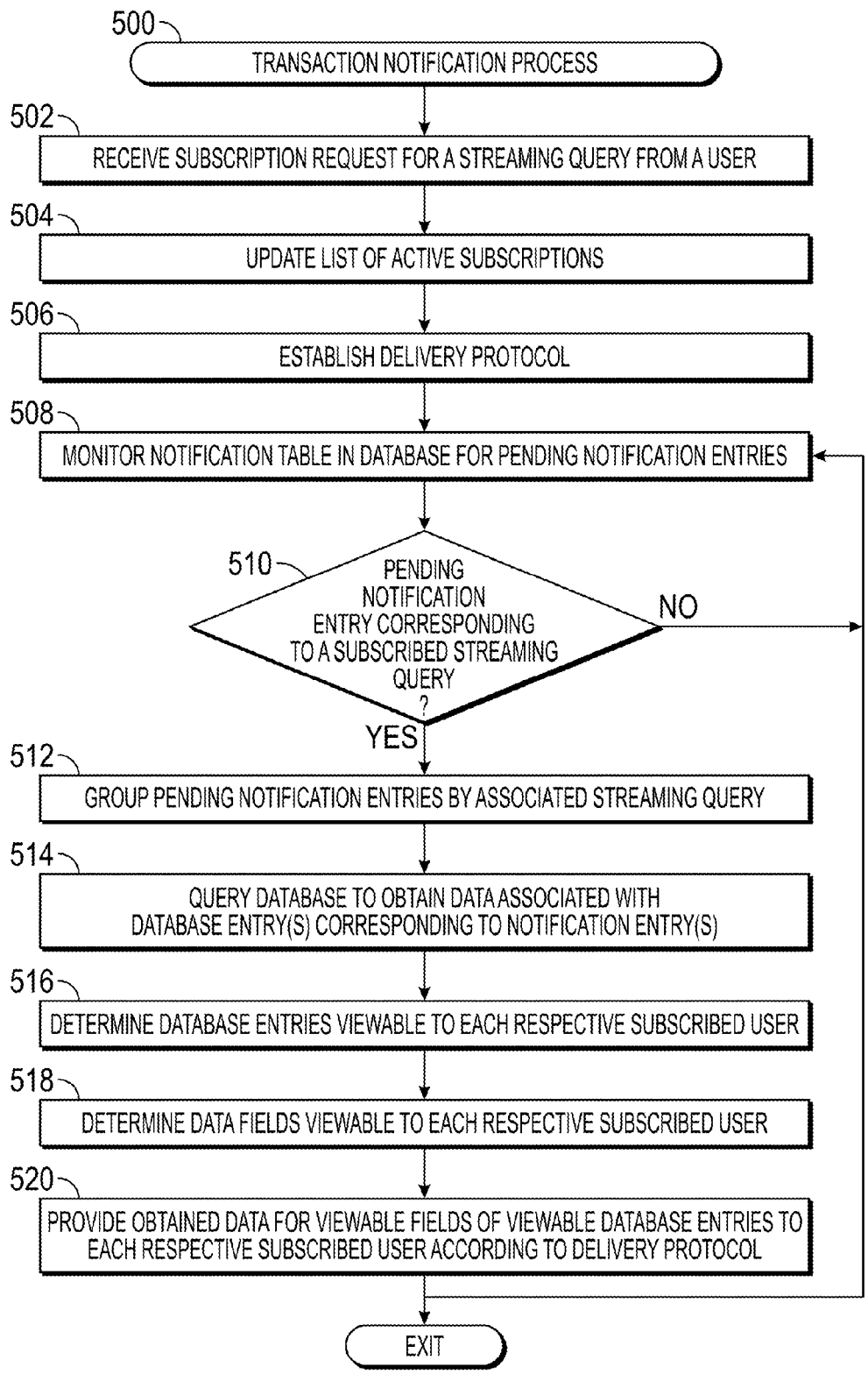
FIG. 5 is a flow diagram of an exemplary transaction notification process suitable for implementation by the application system of FIG. 1.

FIG. 5 depicts an exemplary embodiment of a transaction notification process 500 suitable for implementation by an application system, such as application system 100, to provide substantially real-time notifications of data transactions satisfying one or more streaming queries on one or more subscribed client devices. The various tasks performed in connection with the illustrated process 500 may be hardware, firmware and/or software executed by processing circuitry, or any combination thereof. For illustrative purposes, the following description may refer to elements mentioned above in connection with FIG. 1. In practice, portions of the transaction notification process 500 may be performed by different elements of the application system 100. That said, in exemplary embodiments, the transaction notification process 500 is performed by the distributing application server 104 and/or application platform 132. It should be appreciated that the transaction notification process 500 may include any number of additional or alternative tasks, the tasks need not be performed in the illustrated order and/or the tasks may be performed concurrently, and/or the transaction notification process 500 may be incorporated into a more comprehensive procedure or process having additional functionality not described in detail herein. Moreover, one or more of the tasks shown and described in the context of FIG. 5 could be omitted from a practical embodiment of the transaction notification process 500 as long as the intended overall functionality remains intact.

In an exemplary embodiment, the transaction notification process 500 begins by receiving a subscription request for a streaming query from a user of a client device (task 502). As described above in the context of FIG. 1, the distributing application server 104 and/or application platform 132 generates or otherwise provides an instance of a virtual application 134 in a browser application 109 on a client device 108. In an exemplary embodiment, the user of the client device 108 utilizes the browser application 109 to interface with the application server 104 to indicate a streaming query that the user of the client device 108 would like to be subscribed to. For example, the application platform 132 and/or virtual application 134 may access the definition table 118 of the database 110 and generate or otherwise provide, within the browser application 109, a list of existing streaming queries that the user may subscribe to along with graphical user interface elements to allow the user to select or otherwise indicate the streaming query the user would like to subscribe to. In this regard, the application platform 132 and/or virtual application 134 may list or otherwise provide only those streaming queries that are accessible to the user's tenant (e.g., streaming query entries in the definition table 118 having an associated tenant identifier matching the tenant identifier for the user's tenant), so that the subscription request corresponds to a streaming query associated with a tenant identifier that matches the tenant identifier associated with the user of the subscribing client device 108. For example, the distributing application server 104 may provide a list of a plurality of streaming queries associated with the same tenant identifier as the user of the client device 108, wherein the client device 108 and/or browser application 109 displays or otherwise presents the list on the client device 108 and generates the subscription request in response to identifying selection of a streaming query from the list by the user of the client device 108. In some embodiments, the application platform 132 and/or virtual application 134 rejects or otherwise denies a subscription request for a streaming query that is associated with a tenant identifier that is different from the tenant identifier associated with the user of the subscribing client device 108.

After receiving the subscription request from the user, the transaction notification process 500 continues by updating a list of streaming query subscriptions currently being supported by the application server (task 504). As described above in the context of FIG. 1, in exemplary embodiments, the distributing application server 104 maintains a subscription table 138 containing a listing of the subscribed streaming queries being monitored by the distributing application server 104 and the client devices accessing the distributing application server 104 that are associated with those subscriptions. For example, referring to FIG. 3, in response to receiving a subscription request corresponding to the first streaming query in the definition table 300, the virtual application 134 and/or subscription engine 137 creates an entry in the active subscription table 138 that maintains an association between the identifier assigned to the first streaming query (e.g., 'QUERY_ID_1') and an identifier associated with the client device 108. In this manner, the table 138 maintains a listing of the streaming queries that are subscribed to by a client device interfacing with the database 110 via the distributing application server 104 along with the respective client device that is subscribed the streaming query.

In an exemplary embodiment, the transaction notification process 500 continues by establishing a delivery protocol with the client device for providing data associated with data transactions triggering real-time notifications (task 506). In accordance with one or more embodiments, the browser application 109 on the client device 108 automatically attempts to establish a streaming connection with the distributing application server 104 using long-polling. For example, the browser application 109 on the client device 108 may initiate a handshake with the streaming engine 136 and/or application platform 132 using the Bayeux Protocol or CometD programming language to request a long-polling connection associated with the subscribed streaming query that will be held open by the streaming engine 136 and/or application platform 132, as described in greater detail below in the context of FIG. 6. In this regard, when the streaming engine 136 and/or application platform 132 determines that the long-polling connection is allowable, the streaming engine 136 and/or application platform 132 does not immediately respond to the client device 108 and holds the long-polling request open. In accordance with one or more embodiments, the streaming engine 136 and/or application platform 132 also generates an identifier that is associated with client device 108 that may be utilized to establish an association between the client device 108 and/or the streaming connection and the streaming query the client device 108 is subscribed to.

Still referring to FIG. 5, in exemplary embodiments, the transaction notification process 500 continues by monitoring the notification table maintained by the database for pending notification entries indicative of recent data transactions satisfying one or more streaming queries supported by the application system (task 508). In this regard, a pending notification entry should be understood as referring to an entry in the notification table that was created after the most recent (or preceding) polling of the notification table, and thus, any notifications associated with this entry that are pending and have not yet been provided to or otherwise generated by subscribed client devices accessing the distributing application server. In exemplary embodiments, the subscription engine 137 polls or otherwise accesses the database 110 to determine if there are any recently created entries in the notification table 116 having a timestamp corresponding to notification-triggering data transactions occurring after the previous polling of the notification table 116, and in response to identifying pending notification entries in the notification table 116, the subscription engine 137 obtains or otherwise copies those pending notification entries in the notification table 116 to the distributing application server 104. For example, referring again to FIG. 4, the subscription engine 137 may initially poll the notification table 400 in the database at an initial time that precedes the creation of the first entry of the notification table 400 and obtain, from the database, the current transaction identifier indicative of the current database time (e.g., 'DB_TIME_0') for use as an indication of the most recent polling time. The subscription engine 137 stores or otherwise maintains the obtained transaction identifier (e.g., 'DB_TIME_0'), and after waiting for some amount of time, the subscription engine 137 subsequently polls the notification table 400 for any entries having an associated transaction identifier that is greater than the previously obtained transaction identifier. Thus, when the subscription engine 137 polls the notification table 400 at some database time after creation of one or more entries in the notification table 400, the subscription engine 137 identifies those entries having a timestamp preceded by the most recent polling time as new pending notification entries, obtains or otherwise copies the values for the columns of those pending notification entries to the distributing application server 104, and updates the most recent polling time indicator to be equal to the transaction identifier associated with the most recent (or latest) entry in the notification table 400. For example, when the subscription engine 137 polls the notification table 400 at some database time after creation of the second entry in the notification table 400 but before creation of the third entry in the notification table 400, the subscription engine 137 maintains the timestamp of the second entry in the notification table 400 (e.g., 'DB_TIME_2') as the indication of the most recent polling time. Thus, when the subscription engine 137 subsequently polls the notification table 400, the subscription engine 137 identifies any entries having a timestamp that is preceded by the timestamp of the second entry (e.g., 'DB_TIME_2') as pending notification entries and disregards entries in the notification table 400 having timestamps that precede the most recent polling time.

Referring again to FIG. 5, in the illustrated embodiment, the transaction notification process 500 continues by determining or otherwise identifying whether any of the pending notification entries correspond to a subscribed streaming query and grouping any pending notification entries that corresponding to a subscribed streaming query by their associated streaming query (tasks 510, 512). In this regard, the subscription engine 137 compares the streaming query identifiers associated with the pending notification entries to the streaming query identifiers in the active subscription table 138 to identify whether any of the pending notification entries are associated with a streaming query that is subscribed to by a client device accessing the distributing application server 104. The subscription engine 137 may discard or delete the obtained information pertaining to pending notification entries that are not associated with a subscribed streaming query supported by the distributing application server 104. In this regard, when none of the pending notification entries match a subscribed streaming query supported by the distributing application server 104, the transaction notification process 500 may continue periodically polling or otherwise monitoring the notification table 116 until identifying pending notification queries that correspond to a subscribed streaming query (e.g., task 508). For the pending notification entries having a streaming query identifier that matches a streaming query identifier in the table 138, the subscription engine 137 utilizes the streaming query identifiers associated with the obtained pending notification entries to group the pending notification entries by their associated streaming query. For example, referring again to FIG. 4, if the first four entries of the notification table 400 are identified as new pending notification entries, the subscription engine 137 may group the first and fourth entries by virtue of both entries being associated with the second streaming query (e.g., 'QUERY_ID_2').

Still referring to FIG. 5, and with continued reference to FIGS. 1 and 4, in an exemplary embodiment, after grouping the pending notification entries by their associated streaming query, for each group of pending notifications, the transaction notification process 500 continues by querying the database for the data and/or information associated with the respective database entries that corresponds to the respective pending notification entries of the group using the identifiers associated with the respective database entries and the query statement for its associated streaming query (task 514). In this regard, the subscription engine 137 utilizes the identifier corresponding to the location of the corresponding database entry in the database 110 to obtain, from the data tables 114 in the database 110, the data and/or other information associated with the database entry that corresponds to the notification-triggering data transaction corresponding to that pending notification entry.

For example, referring again to FIG. 4, after grouping the first and fourth notification entries in the table 400 by their streaming query identifier, the subscription engine 137 may utilize the unique identifier corresponding to the location of the database entry associated with first notification entry (e.g., 'RECORD_ID_3') and the unique identifier corresponding to the location of the database entry associated with the fourth notification entry (e.g., 'RECORD_ID_4') to query the database 110 using the associated query statement (e.g., 'QUERY_STATEMENT_2') to obtain the data and/or information for those database entries from the data tables 114. In this manner, the query statement associated with a streaming query is executed or otherwise performed by the database 110 only once to obtain the relevant data fields identified by that query statement for all of the database entries associated with that streaming query, and the efficiency of the querying is improved by providing the modified query statement that includes the identifiers for the location of those database entries in the database 110. In accordance with one or more embodiments, the subscription engine 137 provides a modified query statement to the database 110 that consists of the query statement associated with a respective streaming query modified to utilize the identifiers for the database entries that satisfy that streaming query as the row selection parameters (e.g., WHERE parameters) for the query. In this regard, although not illustrated in FIG. 1, in practice, the application platform 134 and/or distributing application server 104 may include or otherwise implement a local definition table representative of the definition table 118 by obtaining the definition information from the definition table 118 in a similar manner as described above to maintain the query statement associated with a subscribed streaming query and support the subscription engine 137 generating modified query statements. For example, if 'QUERY_STATEMENT_2' corresponds to 'SELECT name, value from account WHERE value>10000', the modified query statement provided to the database 110 by the subscription engine 137 may be 'SELECT name, value from account WHERE record_id=RECORD_ID_3 or RECORD_ID_4' to obtain the name and value data fields corresponding to the first and fourth notification entries because the previous row selection parameter (e.g., value>10000) has already been identified as being satisfied for those entries by the originating application server 102 and/or transaction monitoring engine 126 during the transaction identification process 200, as described above.

In an exemplary embodiment, after querying the database to obtain the data and/or information associated with the database entries that correspond to the pending notification entries for a subscribed streaming query, the transaction notification process 500 continues by determining, for each respective user subscribed to that streaming query, which of the database entries are viewable or otherwise accessible to that respective user based on that respective user's permissions within the application system and/or security settings for the respective database entries (task 516). In this manner, the database entries are mapped or otherwise allocated the database entries to each user subscribed to that streaming query by performing row level security checks to filter database entries from individual users. In exemplary embodiments, the subscription engine 137 performs row level security checks to ensure a user subscribed to a particular streaming query has access to each database entry associated with that streaming query to ensure the user does not receive data and/or information that the user is not authorized to access and/or view. Referring again to FIG. 4, when the user of the client device 108 is subscribed to the second streaming query (e.g., 'QUERY_ID_2'), after obtaining the data associated with the database entries satisfying the second streaming query (e.g., 'RECORD_ID_3' and 'RECORD_ID_4'), the subscription engine 137 determines whether the user is authorized to access each of the database entries based on the user's privileges, rights and/or permissions within the application system 100 and the security settings for each respective database entry. For example, if the security settings for the database entry associated with 'RECORD_ID_4' indicate that object is only viewable to individuals designated as administrators and the user of the client device 108 does not have administrator privileges, the subscription engine 137 may not map or otherwise allocate that database entry to the user of the client device 108. Thus, the client device 108 may only receive data corresponding to the database entry associated with 'RECORD_ID_3' while other users subscribed to the streaming query 'QUERY_ID_2' having administrator privileges may receive data corresponding to the database entry associated with 'RECORD_ID_4' in addition to data corresponding to the database entry associated with 'RECORD_ID_3'.

After filtering database entries that are not viewable to the different users subscribed to a particular streaming query, the transaction notification process 500 continues by determining, for each respective user, which of the fields of the database entries are viewable or otherwise accessible to that respective user based on that respective user's permissions within the application system before providing data to that subscribed user's client device (tasks 518, 520). In this regard, in exemplary embodiments, the subscription engine 137 performs field level security checks to ensure a user subscribed to a particular streaming query is only provided data for fields that are viewable or otherwise accessible to that user. In other words, field level security checks are performed for each subscribed user to filter out fields of data for the database entries mapped to that user that that subscribed user does not have permission to view and/or access. Referring again to FIG. 4, after mapping the database entry associated with 'RECORD_ID_3' to the user of the client device 108, the subscription engine 137 determines what fields of the database entry that the user is authorized to view based on the user's privileges, rights and/or permissions within the application system 100 and/or the security settings for the database entry associated with 'RECORD_ID_3'. When the user of the client device 108 does not have permission to view one or more fields of the database entry associated with 'RECORD_ID_3', the subscription engine 137 filters or otherwise prevents those fields of data from the remaining data to be provided to the client device 108. For example, if the database entry associated with 'RECORD_ID_3' is an 'Account' object and the user of the subscribing client device 108 has permission to view the values for the name field and account value field of the 'Account' object but does not have permission to view the contact name field of the 'Account' object, the subscription engine 137 filters or otherwise prevents the value for the contact name field of the database entry associated with 'RECORD_ID_3' from being provided to the client device 108 while the values for the name and account value fields of the database entry associated with 'RECORD_ID_3' are provided to the client device 108. In this manner, the client device 108 is only provided the subset of the data obtained from the database 110 that is viewable by the user of the client device 108, and only for those database entries that are viewable by the user of the client device 108.

In exemplary embodiments, the subscription engine 137 provides the fields of obtained data that are viewable by the user of the client device 108 to the streaming engine 136, which, in turn, provides those fields of data to the user of the client device 108 according to the delivery protocol established with the browser application 109 on the client device 108. In this regard, if a long-polling connection has been established and held open by the streaming engine 136 and/or application platform 132, the streaming engine 136 pushes the fields of data to the client device 108 by transmitting or otherwise providing a response to the long-polling request (e.g., a long-polling response message) that contains the fields of data provided by the subscription engine 137. Upon receiving the fields of data from the application platform 132 and/or distributing application server 104, the browser application 109 generates or otherwise provides a notification of the data transactions that satisfy the subscribed streaming query based on the received fields of data associated with those data transactions. For example, referring again to FIG. 4, if the data transaction associated with the database entry 'RECORD_ID_3' that satisfied the query statement 'QUERY_STATEMENT_2' was the creation of a new 'Account' object having an account value greater than 10,000, the browser application 109 may present or otherwise display, on the client device 108, a graphical indication that a new 'Account' having a value of 12,500 was created using the values for the account name and account value fields retrieved from the database 110 and provided to the client device 108 by the subscription engine 137 via the streaming engine 136.

Still referring to FIG. 5, in exemplary embodiments, the loop defined by tasks 508, 510, 512, 514, 516, 518 and 520 repeats throughout operation of the application system 100 to continually monitor for new pending notification entries in the notification table 116 that satisfy actively subscribed-to streaming queries and provide, to the client device associated with each user subscribed to a particular streaming query, fields of data viewable by the respective user that are obtained from the database 110 for database entries accessible by the respective user that correspond to data transactions satisfying the subscribed streaming query. In exemplary embodiments, the subscription engine 137 polls the notification table 137 with a relatively high frequency (e.g., every few seconds) so that data is provided to subscribed client devices substantially in real-time (e.g., with little delay between the occurrence of the data transaction and the corresponding notification being presented on the client device 108).

Figure 6:
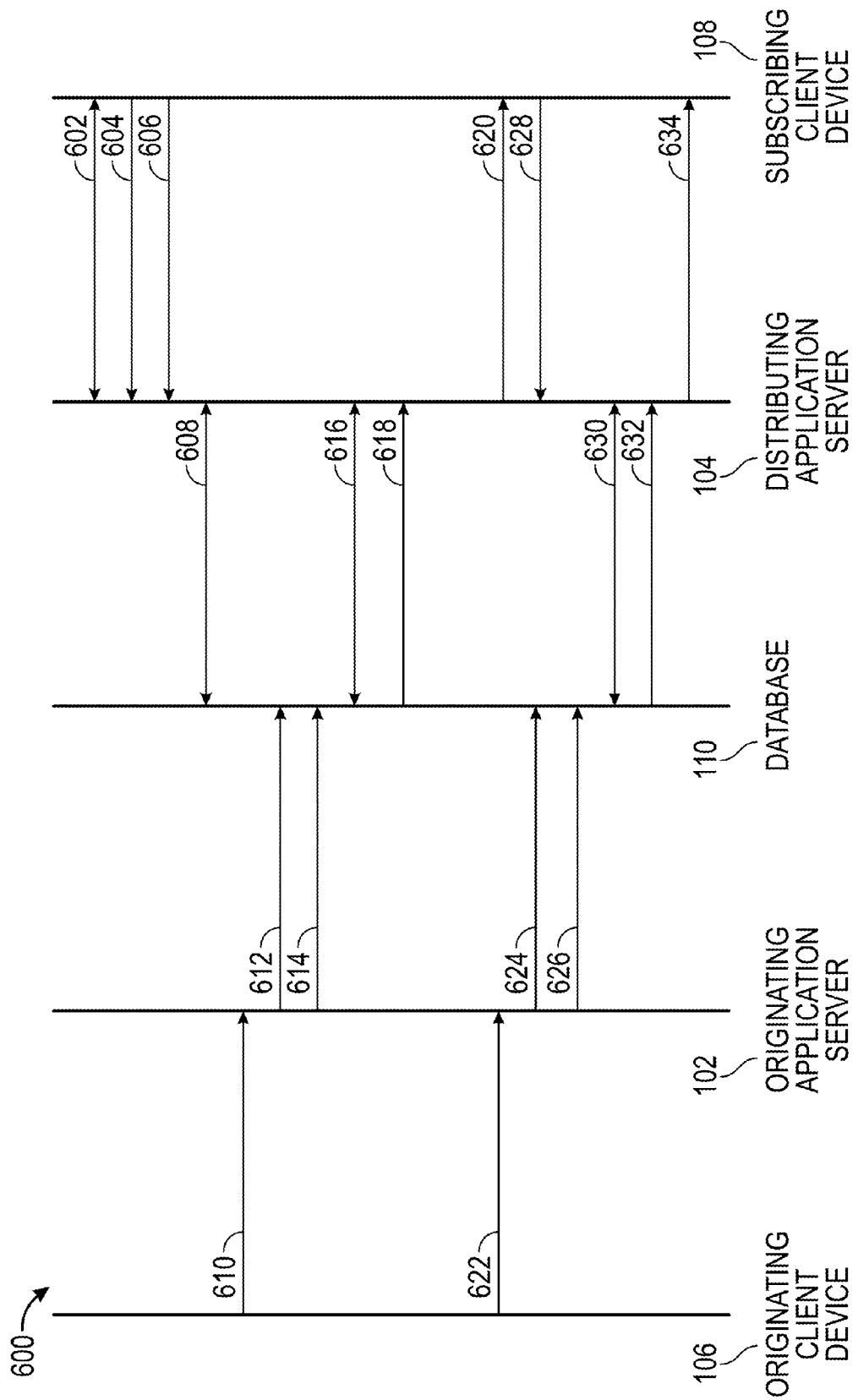
FIG. 6 is a diagram illustrating communications within the application system of FIG. 1 in accordance with one exemplary embodiment of the transaction identification process of FIG. 2 in conjunction with the transaction notification process of FIG. 5.

FIG. 6 illustrates an exemplary sequence 600 of communications within the application system 100 in accordance with an exemplary embodiment of the transaction identification process 200 of FIG. 2 in conjunction with the transaction notification process 500 of FIG. 5. Referring to FIG. 6, and with continued reference to FIGS. 1-5, the illustrated sequence 600 begins with the subscribing client device 108 transmitting or otherwise communicating, to the distributing application server 104, a handshake request for negotiating a streaming connection (or channel) with the distributing application server 104, wherein the streaming engine 136 transmits or otherwise communicates a handshake response message that indicates the types of connections supported by the distributing application server 104. In exemplary embodiments, in response to receiving the handshake request, the streaming engine 136 transmits a handshake response message indicating that the streaming engine 136 will support a long-polling streaming connection with the subscribing client device 108. In response, the subscribing client device 108 transmits or otherwise communicates a subscription request 604 identifying the streaming query that the user of the client device 108 would like to subscribe to, wherein the streaming engine 136 receives the streaming request and provides the streaming request to the subscription engine 137 for updating the active subscription table 138 to maintain an association between the subscribing client device 108 and the streaming query that the subscribing client device 108 is subscribing to. For example, if the subscription request indicates that the client device 108 would like to subscribe to the second streaming query from the definition table 300 and the tenant identifier associated with the user of the subscribing client device 108 indicates the subscribing user is associated with the same tenant that the second streaming query is associated with (e.g., 'ORGID_2'), the subscription engine 137 creates an entry in the table 138 maintaining an association between an identifier associated with the subscribing client device 108 and the streaming query identifier for the second streaming query (e.g., 'QUERY_ID_2'). As described above, the identifier associated with the subscribing client device 108 may be generated and assigned to the subscribing client device 108 by the distributing application server 104. After providing the subscription request 604, the subscribing client device 108 transmits or otherwise communicates a long-polling request 606 to the streaming engine 136 to initiate or otherwise establish the long-polling streaming connection to the distributing application server 104 associated with the subscription request 604. In the illustrated embodiment, streaming engine 136 does not immediately respond to the long-polling request 606 and holds the long-polling streaming connection open until identifying notification-generating data transactions associated with the subscription request, as described in greater detail below.

After updating the table 138 to indicate the streaming query subscribed to by the subscribing client device 108, the subscription engine 137 polls 608 the notification table 116 of the database 110 and obtain any entries created after the most recent polling of the notification table 116. In this regard, entries created after the most recent polling of the notification table 116 correspond to data transactions satisfying a streaming query that occurred after the previous polling of the notification table 116 by the subscription engine 137. In the illustrated embodiment, at some point after the first polling 608 by the subscription engine 137, a user associated with the same tenant as the user of the subscribing client device 108 (e.g., 'ORGID_2') utilizes the utilizes the virtual application 124 on the originating client device 106 to input or otherwise provide data 610 for storage in the database 110. In response to receiving the user input data 610, the application platform 122 and/or virtual application 124 initiates or otherwise performs a data transaction 612 on behalf of the client device 106 to store the received user input data in one or more of the data tables 114 in the appropriate manner, for example, by creating a new database entry in one of the data tables 114 that contains the user input data or by modifying an existing database entry in one of the data tables 114 to reflect the user input data. As described above in the context of FIG. 2, the transaction monitoring engine 126 compares the data transaction 612 to the streaming queries maintained in the definition table 128, and in response to determining the data transaction 612 satisfies a streaming query, the transaction monitoring engine 126 creates a new entry 614 in the notification table 116 that indicates the database entry associated with the data transaction 612 and the streaming query that the data transaction 612 satisfies. For example, after determining the tenant identifier associated with the user of the originating client device 106 responsible for the data transaction matches the tenant identifier associated with the second streaming query (e.g., 'ORGID_2'), the transaction monitoring engine 126 determines whether the data transaction is relevant to the second streaming query before determining whether the data transaction satisfies the query statement associated with the second streaming query (e.g., 'QUERY_STATEMENT_2'), as described above. In this manner, when the data transaction 612 corresponds to the creation of a new database entry having a value for one or more fields that satisfies the query statement associated with the second streaming query (e.g., 'QUERY_STATEMENT_2'), the subscription engine 137 creates a new notification entry 614 in the table 400 that includes the unique identifier associated with the created database entry (e.g., 'RECORD_ID_3'), the identifier associated with the streaming query satisfied by the data transaction (e.g., 'QUERY_ID_2'), the type of data transaction involved, and the transaction identifier (e.g., 'DB_TIME_1') indicative of the time when the data transaction occurred.

As described above in the context of FIG. 5, in exemplary embodiments, the subscription engine 137 periodically polls the notification table 116 for pending notification entries that were created after the most recent polling of the notification table 116. In this regard, in the illustrated embodiment, after the transaction monitoring engine 126 creates the notification entry 614 corresponding to the data transaction performed 612 on behalf of the originating client device 106, the subscription engine 137 polls 616 the notification table 116 to obtain any pending notification entries created after the preceding polling 608 of the notification table 116. As described above in the context of FIG. 5, the subscription engine 137 on the distributing application server 104 identifies the pending notification entry associated with the second streaming query statement as corresponding to the subscribed streaming query associated with the subscribing client device 108 and obtains the data 618 for the data transaction associated with the pending notification entry from one or more data tables 114 of the database 110 by querying the database 110 by modifying the query statement associated with the subscribed streaming query (e.g., 'QUERY_STATEMENT_2') to use the unique identifier associated with the database entry (e.g., 'RECORD_ID_3') that was obtained 616 from the notification table 116. After obtaining the data from the database 610, the subscription engine 137 performs row level security checks to verify that the user of the subscribing client device 108 is capable of viewing or otherwise accessing the database entry associated with the pending notification entry, and then performs field level security checks to filter any fields of data that the user is not capable of viewing or otherwise accessing. In this manner, for the fields of the 'RECORD_ID_3' database entry that are viewable and/or accessible by the user of the subscribing client device 108, the subscription engine 137 provides the data for those fields of the 'RECORD_ID_3' database entry that was obtained from the database 110 to the streaming engine 136 when the user of the subscribing client device 108 is subscribed to the 'QUERY_ID_2' streaming query before the 'RECORD_ID_3' database entry is created. In the illustrated embodiment, the streaming engine 136 provides the obtained data 620 to the subscribing client device 108 by responding to the long-polling request with the obtained data, wherein the browser application 109 on the subscribing client device 108 generates or otherwise provides a notification to the user of creation of the 'RECORD_ID_3' database entry in the database 110 based on the portions of obtained data received from the distributing application server 104.

Still referring to FIG. 6, in the illustrated embodiment, at some point after the 'RECORD_ID_3' database entry is created on behalf of the originating client device 106, the user of the originating client device 106 inputs or otherwise provides data 622 for storage in the database 110, wherein the application platform 122 and/or virtual application 124 initiates or otherwise performs a data transaction 624 to create a new database entry in the database 110 that contains the received user input data. As described above, the transaction monitoring engine 126 compares the data transaction 624 to the streaming queries maintained in the definition table 128, and in response to determining the data transaction 624 satisfies the second streaming query, the transaction monitoring engine 126 creates a new entry 626 in the notification table 116 that indicates the database entry associated with the data transaction 624 (e.g., 'RECORD_ID_4') and the second streaming query (e.g., 'QUERY_ID_2'). After receiving the response 620 to the initial long-polling request 606, the subscribing client device 108 transmits or otherwise communicates a long-polling request 628 to the streaming engine 136 to maintain the long-polling streaming connection to the distributing application server 104. As described above, the subscription engine 137 polls 630 the notification table 116 for pending notification entries that were created after the preceding polling 616 of the notification table 116, identifies the pending notification entry associated with the 'RECORD_ID_4' database entry as corresponding to the subscribed streaming query associated with the subscribing client device 108, queries the database 110 by modifying the query statement associated with the subscribed query to use the 'RECORD_ID_4' identifier to obtain the data 632 associated with the 'RECORD_ID_4' database entry, and provides the portions of the obtained data 632 viewable or otherwise accessible by the user of the subscribing client device 108 to the streaming engine 136, which, in turn, provides 634 those portions of obtained data to the subscribing client device 108 as a response to the long-polling request 628, as described above.

Figure 7:
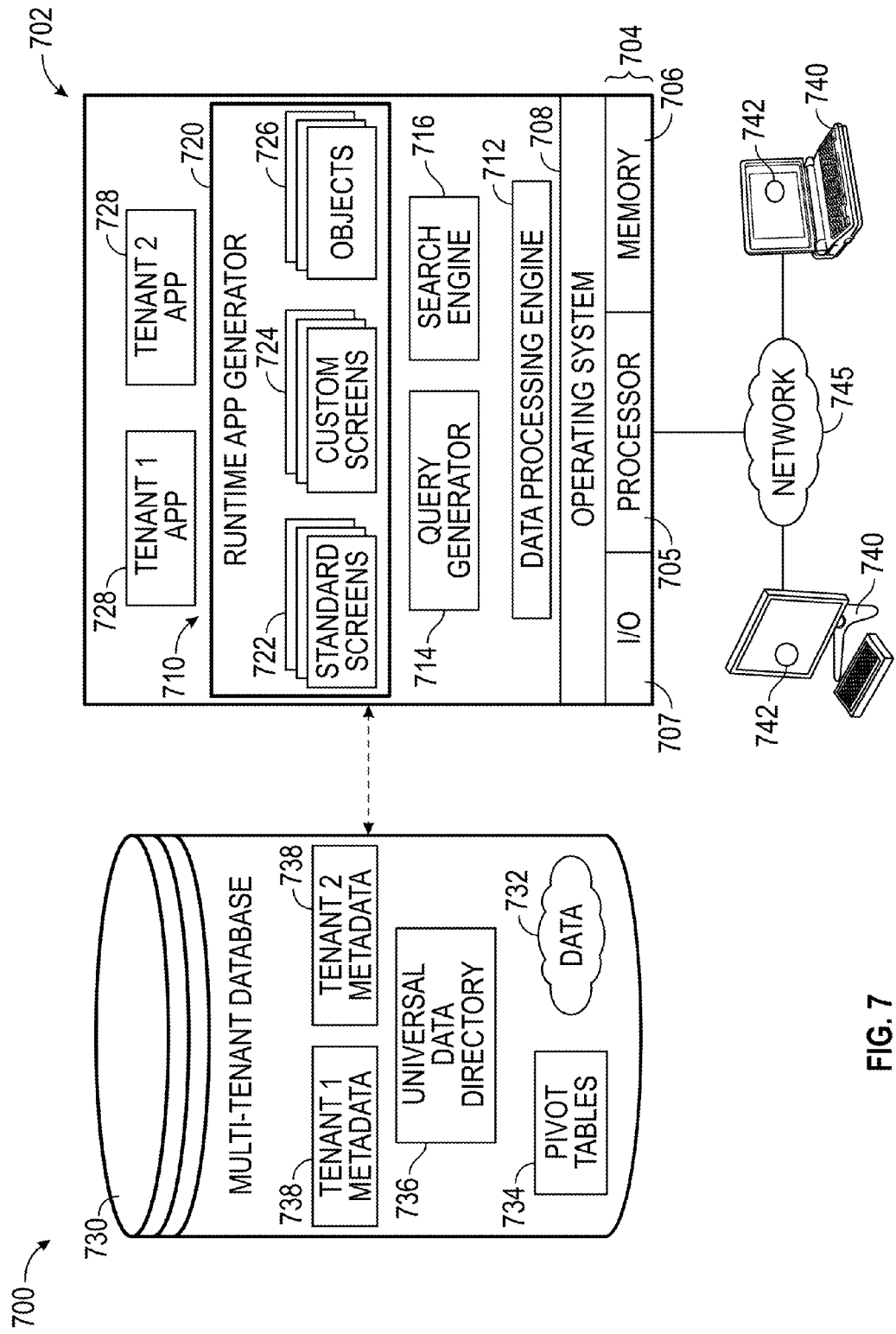
FIG. 7 is a block diagram of an exemplary multi-tenant system suitable for implementation by the application system of FIG. 1 in accordance with one or more embodiments.

Referring now to FIG. 7, in accordance with one or more embodiments, the database 110 is realized as a multi-tenant database that stores or otherwise maintains data associated with a plurality of tenants as part of a multi-tenant system, and the application servers 102, 104 provide instances of virtual applications 124, 134 to users of multiple different tenants, as described in greater detail below. The illustrated multi-tenant system 700 of FIG. 7 includes a server 702 (which may be an originating application server 102 and/or a distributing application server 104) that dynamically creates and supports virtual applications 728 (e.g., virtual applications 124, 134) based upon data 732 from a common database 730 (e.g., database 110) that is shared between multiple tenants, alternatively referred to herein as a multi-tenant database. Data and services generated by the virtual applications 728 are provided via a network 745 (e.g., network 112) to any number of client devices 740 (e.g., originating client devices 106 and/or subscribing client devices 108), as desired. Each virtual application 728 is suitably generated at run-time (or on-demand) using a common application platform 710 that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700. Although multiple tenants may share access to the server 702 and the database 730, the particular data and services provided from the server 702 to each tenant can be securely isolated from those provided to other tenants. The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

Referring now to FIGS. 1-7, to briefly summarize, one advantage of the subject matter described herein is that when the application system 100 is a multi-tenant system, users associated with the same tenant can be notified of data transactions initiated on behalf of other users associated with that tenant substantially in real-time while reducing the load on the multi-tenant database and the application server(s). For example, for a streaming query registered to a first tenant that the users of the client devices 106, 108 are associated with, when the user of the client device 106 initiates a data transaction, the application server 102 matches the user's associated tenant identifier (which is the first tenant's identifier) to the tenant identifier associated with that registered streaming query before determining whether the data transaction satisfies the query statement associated with that streaming query. In this manner, the application server 102 may avoid unnecessarily comparing query statements associated with the first tenant to data transactions performed on behalf of other tenants and vice versa, and similarly, the multi-tenant database 110 is not burdened by having to compare each transaction to the query statements associated with the registered streaming queries for all the tenants supported by the multi-tenant database 110. As described above, when the distributing application server 104 identifies a data transaction satisfying the query statement that the user of client device 108 is subscribed to, the application server 104 queries the multi-tenant database 110 using the unique identifier for the database entry associated with that data transaction, thereby improving the efficiency of the query and reducing the load on the multi-tenant database 110. Additionally, database entries associated with the same query statement are grouped so that the multi-tenant database 110 executes a single query statement to obtain the data for all of the recent data transactions that satisfy that query statement, rather than executing the query statement for each individual data transaction when there are multiple pending notifications associated with that query statement or executing the query statement for each individual user subscribed to that query. Another advantage of the subject matter described herein is that the notification data is provided to subscribed users in accordance with their permissions and/or security settings, which may be established by an administrator associated with that tenant. For example, as described above, row level and field level security checks are applied based on the permissions and/or security settings associated with the user of the client device 108 before providing data to the client device 108. In this manner, the client device 108 is only provided fields of data that are viewable or accessible by the user of the client device 108, and those fields of data are only provided for database entries that are viewable or accessible by the user of the client device 108.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming languages, techniques and/or protocols, computer networking, on-demand and/or multi-tenant systems or databases, authentication, data security, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of identifying transactions satisfying a streaming query, the method comprising:

initiating, by a first application server, a transaction for an entry in a database in response to input data from a client device;

determining an identifier associated with a user of the client device matches an identifier associated with the streaming query;

after determining the identifier associated with the user matches the identifier associated with the streaming query:

determining the transaction is relevant to the streaming query when the transaction involves a field of the entry associated with the transaction that corresponds to a data field of a query statement associated with the streaming query;

determining the transaction satisfies a notification qualifier for the streaming query; and after determining the transaction is relevant to the streaming query and satisfies the notification qualifier, determining the transaction satisfies the streaming query when a value for the field of the entry associated with the transaction satisfies the query statement associated with the streaming query; and updating, by the first application server, a notification table in the database to indicate an association between the entry and the streaming query after determining the transaction satisfies the streaming query.

2. The method of claim 1, the identifier associated with the user comprising a tenant identifier that matches a tenant identifier associated with the streaming query, wherein the method further comprises:

receiving, by a second server coupled to the database, a subscription request for the streaming query from a second client device having a second user associated with the tenant identifier;

monitoring, by the second server, the notification table in the database for indication of the association between the entry and the streaming query; and in response to identifying the indication of the association between the entry and the streaming query:

obtaining, by the second server, data for the entry from the database; and providing at least a portion of the obtained data to the second client device based on permissions associated with the second user.

3. The method of claim 1, wherein updating the notification table comprises creating a new notification entry in the notification table, the new notification entry including a first identifier associated with the entry and a second identifier associated with the streaming query.

4. The method of claim 1, wherein initiating the transaction comprises updating the entry to reflect the input data or creating the entry based on the input data.

5. The method of claim 1, further comprising providing, by the first application server, a virtual application to the client device, wherein the input data is received via the virtual application.

6. The method of claim 1, further comprising determining, by the first application server, metadata for the streaming query based on the query statement, wherein determining whether the transaction is relevant comprises determining whether the transaction is relevant to the streaming query based on the metadata.

7. The method of claim 6, the metadata including the field referenced by the query statement.

8. The method of claim 1, wherein determining the transaction satisfies the query statement comprises determining a result of the query statement would include the entry.

9. The method of claim 1, wherein determining whether the transaction is relevant to the streaming query comprises determining the transaction is relevant to the streaming query when metadata associated with the transaction matches metadata associated with the streaming query.

10. The method of claim 1, further comprising determining the transaction satisfies a notification qualifier for the streaming query prior to determining whether the transaction satisfies the query statement.

11. The method of claim 1, wherein determining the identifier associated with the user of the client device matches the identifier associated with the streaming query comprises determining a tenant identifier associated with the user matches a tenant identifier associated with the streaming query.

12. The method of claim 1, further comprising obtaining, by the first application server, definition information for a plurality of streaming queries from a definition table in the database, the plurality of streaming queries including the streaming query, wherein determining whether the transaction satisfies the streaming query comprises comparing the transaction to the definition information.

13. A server comprising a processing system and a memory, wherein the memory comprises computer-executable instructions that, when executed by the processing system, cause the server to:
   initiate a transaction in response to receiving input data from a client device, resulting in an entry in a database reflecting the data received from the client device;
   determine whether a tenant identifier associated with a user of the client device matches a tenant identifier associated with a streaming query;
   determine whether the transaction satisfies the streaming query when the tenant identifier associated with the user matches the tenant identifier associated with the streaming query; and
   update the database to indicate an association between the entry and the streaming query when the transaction satisfies the streaming query.

14. The server of claim 13, wherein the computer-executable instructions cause the server to provide a virtual application to the client device over a network, wherein the input data is received via the virtual application.

15. The server of claim 13, wherein the computer-executable instructions cause the server to determine whether the transaction satisfies the streaming query by determining whether the entry satisfies a query statement associated with the streaming query.

16. The server of claim 15, wherein the computer-executable instructions cause the server to determine the transaction is relevant to the streaming query and satisfies a notification qualifier associated with the streaming query prior to determining whether the entry satisfies the query statement.

17. A system comprising:
   a database including a notification table and a data table; and
   a server coupled to the database to initiate a transaction for an entry in the data table on behalf of a user of a client device, determine whether a tenant identifier associated with the user matches a tenant identifier associated with a streaming query, determine whether the transaction satisfies a streaming query when the tenant identifier associated with the user matches the tenant identifier associated with the streaming query, and update the notification table to indicate an association between the entry and the streaming query when the transaction satisfies the streaming query.

18. The system of claim 17, wherein:
   the database includes a definition table having definition information for the streaming query; and
   the server obtains the definition information from the definition table and determines the transaction satisfies the streaming query based on the definition information.

19. The system of claim 17, further comprising a second server coupled to the database to receive a subscription request for the streaming query from a second client device, monitor the notification table for indication of transactions satisfying the streaming query, obtain data for the entry from the data table after the notification table is updated to indicate the association between the entry and the streaming query, and provide at least a portion of the obtained data to the second client device, wherein a second user of the second client device is associated with the tenant identifier associated with the user of the client device.

20. The method of claim 1, wherein:
   updating the notification table comprises the first application server creating a new notification entry in the notification table; and
   the new notification entry includes:
      a first identifier corresponding to a location of the entry in one or more data tables of the database;
      a second identifier associated with the streaming query; and
      a transaction type associated with the transaction.

* * * * *